United States Patent [19]
Caudron

[11] 3,986,444
[45] Oct. 19, 1976

[54] ELECTRIC TOASTER
[75] Inventor: Claude Caudron, Saint-Ame-Vagney, France
[73] Assignee: Seb S.A., Selongey, France
[22] Filed: Apr. 28, 1975
[21] Appl. No.: 572,302

[30] Foreign Application Priority Data
May 16, 1974 France .................. 74.17000

[52] U.S. Cl. .................. 99/391; 99/393; 219/521
[51] Int. Cl.² .................. A47J 37/08
[58] Field of Search ............ 99/392, 393, 389, 386, 99/385, 373, 372, 371; 219/521

[56] References Cited
UNITED STATES PATENTS
1,903,324  4/1933  Codling .................. 99/392
2,847,931  8/1958  Saint .................. 99/389

Primary Examiner—Richard E. Aegerter
Assistant Examiner—Michael H. Thaler
Attorney, Agent, or Firm—Young & Thompson

[57] ABSTRACT

A slice of bread is brought into position opposite heating resistors and extracted from the toaster by means of a carriage having upwardly flared projections for receiving and holding the slice. Supports pivotally mounted on the casing carry shaped guiding members each having a projecting portion and a bent-back portion. At the time of introduction and extraction, the flared projections of the carriage are displaced in sliding motion on the projecting portions of the guiding members while maintaining these latter at a distance from the slice of bread.

1 Claim, 5 Drawing Figures 3,986,444

ELECTRIC TOASTER

This invention relates to an electric toaster.

In the many known designs of electric toasters, provisions is usually made for two flat heating resistors placed in parallel relation within a casing on each side of a slice of bread in the toasting position.

The toaster aforesaid contains a movable carriage which is intended to receive one edge of the slice of bread in order to bring this latter through a slot of the toaster into the toasting position and subsequently to extract the slice after toasting. A movable support which is pivotally attached to the casing along an axis substantially parallel to the slot and which is associated with elastic restoring means serves to guide the slice of bread during its introduction into the toaster and to maintain this latter in the toasting position. The carriage is operated by the user by means of an external lever with which are usually associated a switch for turning-on the heating resistors and a device for locking the carriage in the toasting position. At the end of a time interval determined in the majority of designs by a bimetallic-strip relay which can be of adjustable type, the toasted slice is extracted automatically under the action of a spring for returning the carriage when this latter has been released by the bimetallic-strip relay.

Appliances of the type mentioned above are usually attended by a disadvantage which is particularly noticeable when it is desired to toast slices of bread of irregular thickness and shape. In fact, the slices of bread are usually guided and positioned in a somewhat approximate fashion which is only acceptable in the case of slices which have been cut with precision from accurately calibrated loaves as is very commonly the practice in certain countries. Irregular slices are often liable to be toasted incorrectly and even to burn at some points. Such slices are liable to come into contact with the heating resistors and to leave some burnt fragments which adhere to the heating elements. This is liable to affect the operation of the toaster in a very short time and to cause damage to the heating resistor and to the mechanism.

The aim of the invention is to overcome the disadvantages mentioned in the foregoing by providing a simple design of toaster in which the slice to be toasted is accurately positioned with respect to the heating resistors so as to ensure uniform toasting of bread while preventing in particular any excessive proximity with respect to the heating resistors.

The invention is directed to an electric toaster comprising at least one flat heating resistor mounted within a casing which has a slot for the insertion of a slice of bread and contains a movable carriage for receiving one edge of the slice of bread in order to bring the slice into the toasting position opposite to the heating resistor and in order to permit subsequent extraction of said slice; at least one movable support is pivotally attached to the casing along an axis substantially parallel to the slot and associated with elastic restoring means for guiding and maintaining the slice in the toasting position.

In accordance with the invention, the carriage comprises stationary lateral projections flared towards the slot in order to receive the aforesaid edge of the slice and to maintain said slice in the toasting position with respect to the heating resistor; at least one shape guiding member is carried by the movable support and disposed on said support in a transverse direction with respect to its pivotal axis; the guiding member aforesaid comprises a projecting portion applied against the slice of bread in the toasting position and a bent-back portion which is rearwardly displaced from the carriage in the same position; a projection of the carriage is accordingly applied against the projecting portion of the guiding member so as to slide on the guiding member at the time of introduction and extraction of the slice while maintaining the projecting portion of the shaped guiding member of the support at a distance from said slice.

The particular features recalled in the foregoing ensure accurate centering of the bottom edge of the slice of bread in the toasting position at a predetermined distance with respect to the heating resistor. This prevents any defective toasting of the slice even if its shape is relatively irregular and if the toaster receives slices of varying thickness.

In a preferred embodiment of the invention, the toaster of the type aforesaid is provided with two substantially parallel heating resistors placed on each side of the toasting position within a parallelepipedal casing; said toaster is further provided with two substantially rectangular movable supports also placed on side of the toasting position aforesaid.

The movable supports comprise a uniform series of shaped parallel guiding members associated with two transverse side members so as to form a support grid. The transverse side element located in proximity to the bread-insertion slot is associated at the extremities thereof with means for effecting the elastic return of the corresponding support and the side member which is remote from the slot constitutes the pivot-pin of said support.

As will be explained hereinafter, these arrangements make it possible to construct an economical and efficient system for holding slices of bread having irregular shapes and varying thicknesses.

Further properties and advantages of the invention will become apparent from the following description of two advantageous embodiments which are presented hereinafter by way of example without any limitation being implied, reference being made to the accompanying drawings, wherein.

Figure 1:
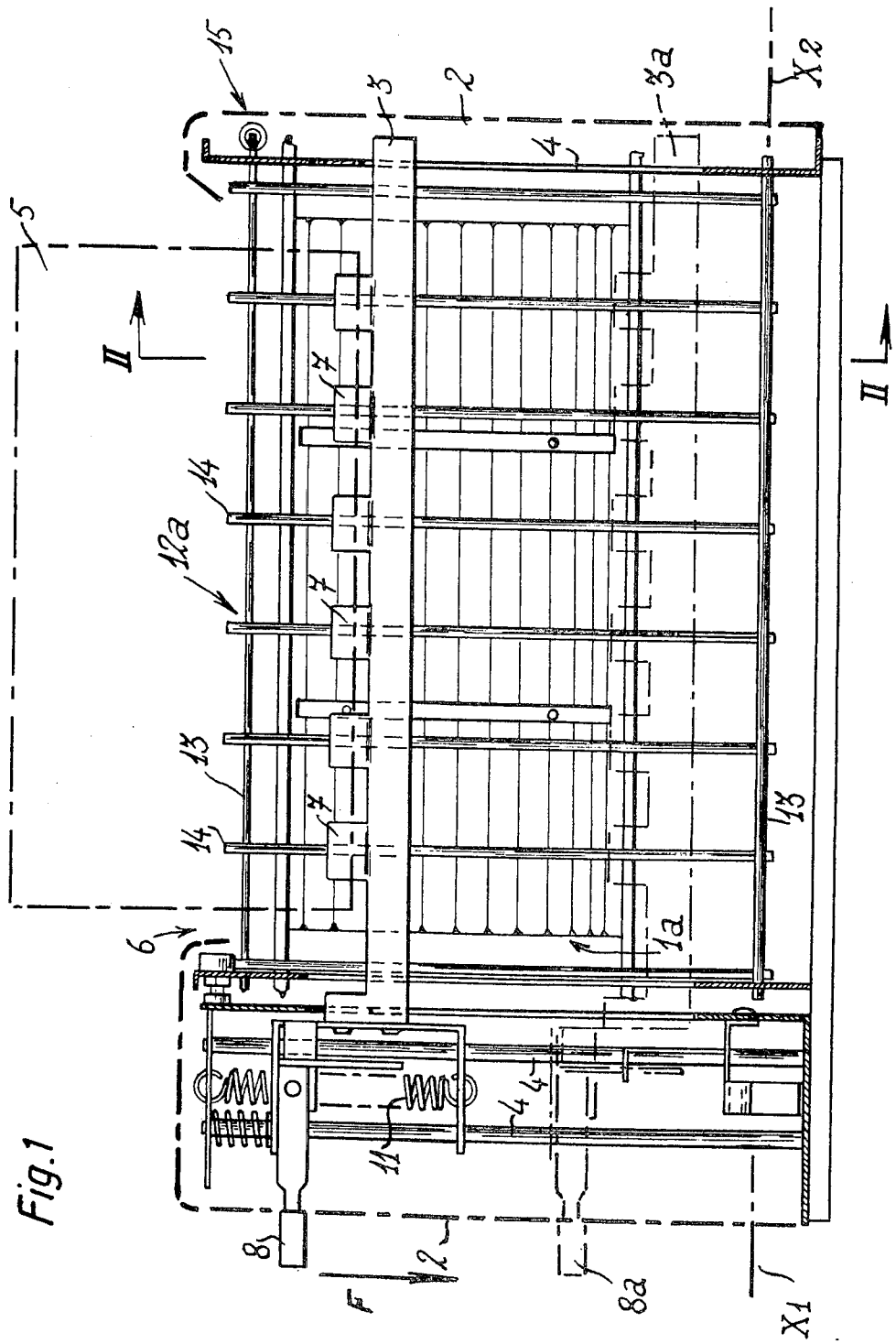
FIG. 1 is a view in elevation of a toaster in accordance with the invention and in cross-section along line I—I of FIG. 2.
Figure 3:
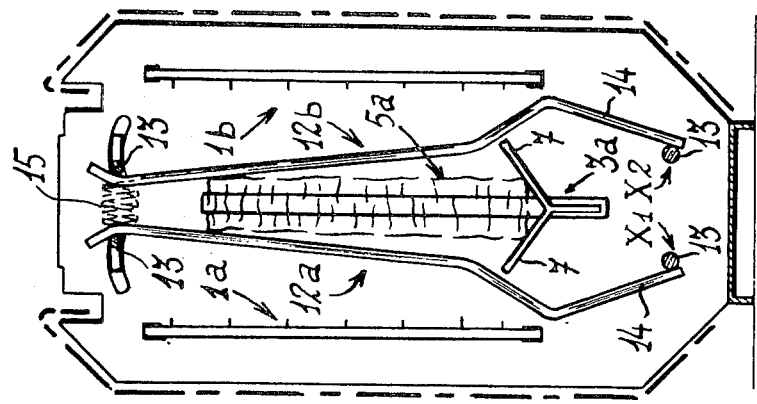
FIG. 3 is similar to FIG. 2 and shows the slice of bread in the toasting position.
Figure 2:
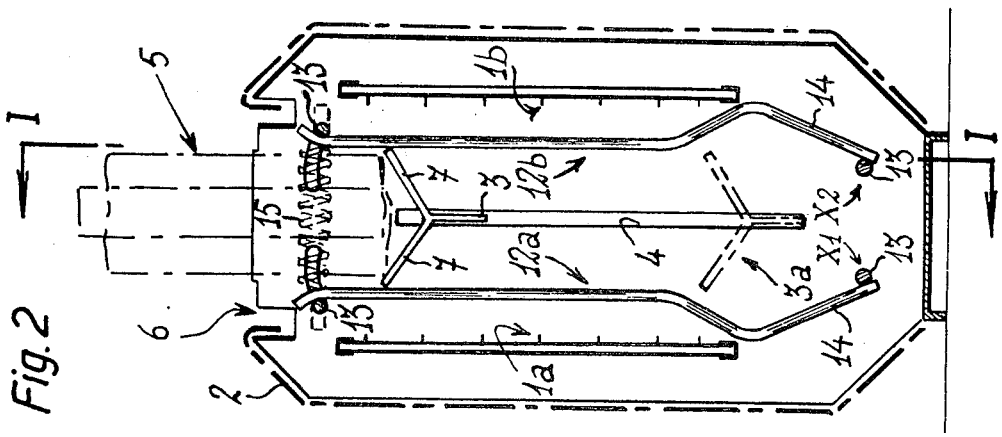
FIG. 2 is a transverse sectional view taken along line II—II of FIG. 1 but showing the section of the entire toaster.

In the embodiment shown in FIGS. 1 to 3, the electric toaster has two heating resistors 1a, 1b mounted within a parallelepipedal casing 2 of polished metal for example and represented diagrammatically in FIGS. 1 and 2 by a chaindotted profile. A rectilinear carriage 3 slidably mounted on paralled guides 4 is intended to receive one edge of a slice of bread 5 which is introduced through a slot 6 as shown in FIG. 2, said slot being parallel to the carriage and having a top opening located at the upper end of the casing 2. Guiding of the slice of bread 5 at the time of introduction into the toaster as well as maintaining of said slice in the toasting position are facilitated by two substantially rectangular movable supports 12a, 12b each pivotally mounted on a pin X1, X2 which is remote from the slot 6 and substantially parallel to this latter. The supports 12a, 12b are associated with elastic restoring means constituted by a restoring spring 15 which tends to draw together the supports 12a, 12b at the ends opposite to the pivot-pins X1, X2.

In order to toast the slice of bread 5 when this latter has been inserted in the slot 6 and maintained in position by the supports 12a, 12b, a lever 8 which forms an extension of the carriage 3 is displaced in the direction of the arrow F (as shown in FIG. 1). The carriage is moved downwards to the position 3a corresponding to full insertion of the slice 5 within the casing 2 in a position opposite to the heating resistors 1a, 1b. A known interlocking mechanism (not shown) serves to lock the carriage 3 temporarily in position 3a and at the same time turns-on the two heating resistors.

At the end of a predetermined heating time, a bimetallic-strip relay (not shown) releases the carriage 3 which moves upwards automatically under the action of a restoring spring 11 (shown in FIG. 1) and cuts-off the current supply to the heating resistors 1a, 1b. The bimetallic-strip relay can be provided with adjusting means in order to obtain a greater or lesser degree of toasting.

In accordance with the invention, the carriage 3 has stationary lateral projections 7 which are flared in the direction of the slot 6 in order to receive the edge of the slice of bread 5 and to maintain this latter in a correctly centered position with respect to the heating resistors 1a, 1b in the toasting position.

The movable supports 12a, 12b comprise shaped guiding members constituted by bars 14 (shown in FIGS. 2 and 3) mounted on the supports 12a, 12b in a direction at right angles to the pivot-pins X1, X2. The bars 14 are maintained applied against the lateral projections 7 under the action of the spring 15 which tends to move the two supports 12a and 12b towards each other. When the slice 5 is in the toasting position (as shown in FIG. 3), a projecting portion of each bar 14 is applied against the slice 5 and a bentback portion is located at a distance from the carriage 3.

Transverse rectilinear members which are parallel to the pivot-pins X1, X2 are associated with the bars 14 so as to constitute a support grid 12 formed by a crossed assembly of rods 13 and bars 14 of stainless steel, for example, which are assembled together by resistance welding. The rods 13 which are located on one side of the slot 6 are associated with the spring 15 at their extremities. The rods 13 corresponding to the ends of the supports 12a, 12b remote from the slot 6 constitute the pivot-pins X1, X2. The aforesaid ends of the rods 13 are engaged in holes of the parallel guides 4 (see FIG. 1).

The bars 14 of the pivotally mounted supports 12a, 12b have a profile such that the two pivotally mounted supports 12a, 12b are substantially parallel to each other in the top position of the carriage 3 (as shown in FIGS. 1 and 2) so as to receive the slice of bread 5 and to guide this latter during its introduction down to the toasting position 5a shown in FIG. 3.

During this movement, the slice of bread 5 is guided substantially at equal distance from the heating resistors 1a, 1b and in a direction parallel to these latter. Once the slice has reached the toasting position 5a (as shown in FIG. 3) in the bottom position 3a of the carriage, a bent-back portion of the profile of each bar 14 serves to maintain this latter at a distance from each lateral projection 7 of the carriage. The restoring spring 15 accordingly serves to draw together the top portions of the pivotally mounted supports 12a, 12b which exert a resilient clamping action on the slice of bread in the toasting position 5a. In consequence, the slice of bread in the toasting position 5a is maintained exactly halfway between the two heating resistors 1a, 1b (as shown in FIG. 3).

The slice of bread in the toasting position 5a is thus toasted in a uniform manner without any danger of being in contact with one of the heating resistors 1a, 1b. Moreover, the profile of the bars 14 and the angular displacement provided for the pivotally mounted supports 12a, 12b permit correct introduction and toasting of slices of bread 5 having irregular shapes and varying dimensions within fairly broad limits as shown in chain-dotted lines in FIG. 2.

It will be readily apparent that the invention is not limited to the form of construction which has been described by way of example and that many alternative forms may accordingly be contemplated without thereby departing from the scope or the spirit of the invention.

Figure 4:
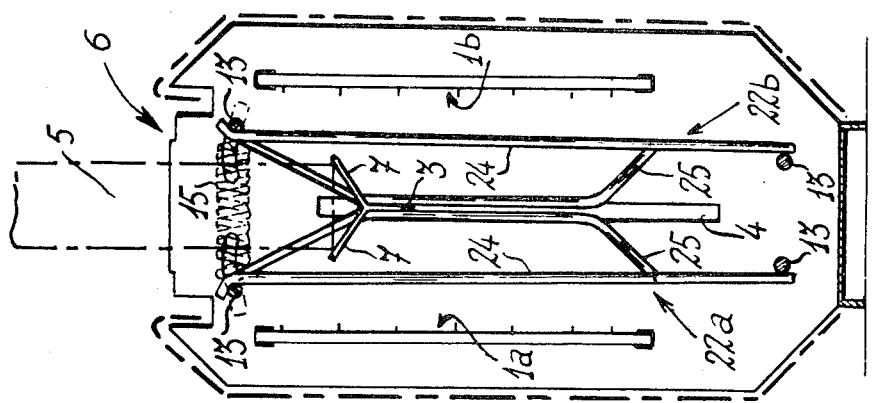
FIG. 4 is similar to FIG. 2 and shows an alternative form of construction of the device for guiding the articulated supports which are controlled in dependence on the movement of the carriage.
Figure 5:
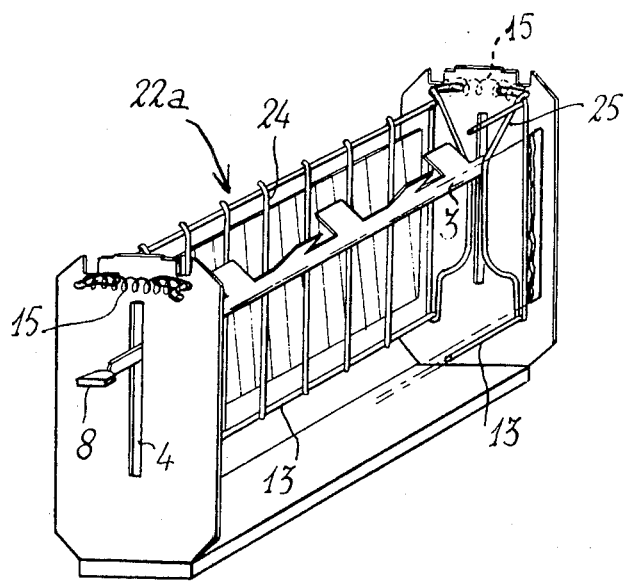
FIG. 5 is a fragmentary perspective view of the interior of a toaster as in FIG. 4.

There is accordingly shown in FIGS. 4 and 5 an advantageous alternative form of construction of the pivotally mounted supports 22a, 22b which serve to guide and hold the slice of bread 5 in position. As in the previous embodiment, the pivotally mounted supports 22a, 22b comprise rectilinear rods 13 which are parallel to the pivot-pins X1, X2 of the supports shown in FIG. 1. On the other hand, the transverse bars 24 of each support 22a, 22b are also rectilinear except for two shaped bars 25 on each side of the support 22a, 22b. Under the action of the restoring spring 15, the shaped bars 25 are applied against the rectilinear portion of the carriage 3 whilst the rectilinear bars 24 remain at a distance from the lateral projections 7.

By virtue of the shaped end bars 25 which are associated with the movements of the carriage 3, there are thus obtained the same effects of guiding and holding of the slice of bread 5 as those described with reference to FIGS. 1 to 3. But in this embodiment, the construction of the pivotally mounted supports 22a, 22b entails substantially lower cost since the elements of each support are rectilinear except for the two shaped end bars 25. In addition, the operation of the carriage 3 is thus made easier and smoother since the shaped end bars 25 can be placed outside the very hot zone opposite to the heating resistors 1a, 1b. This in fact makes it possible to maintain excellent surface polish of the contacting portions of the bars 25 and of the carriage 3 and to prevent adherent deposits of burnt bread fragments on these portions.

In this embodiment of FIGS. 4 and 5, the support 3 is advantageously of substantially greater length than the introduction slot 6 shown in FIG. 1. Thus the shaped bars 25 are more readily maintained at a distance from the heating resistors 1a, 1b and from the very hot slice of bread 5.

I claim:

1. An electric toaster comprising at least one heating resistor mounted within a casing which has a slot for the insertion of a slice of bread, a carriage mounted for vertical movement in the casing for receiving one edge of the slice of bread in order to bring the slice into a toasting position opposite to the resistor and to permit subsequent extraction of said slice, twin movable supports of substantially rectangular shape arranged one on each side of the carriage and pivotally mounted in the casing along two axes substantially parallel to the slot, elastic means urging said supports toward each other for guiding and maintaining the slice in the toasting position, each said support having a pair of shaped guiding members thereon disposed on said support in a transverse direction with respect to its pivotal axis, each said guiding member comprising a projecting portion arranged to come into sliding contact against the carriage for the introduction and the extraction of said slice and a bent-back portion which is spaced from the carriage in the toasting position for ensuring the contact of each support against the slice, each support being at least as long as the slot of the casing and said pair of guiding members of each support being disposed at opposite ends of said support and slot, said pair of guiding members of each support being separated by substantially rectilinear members in rearwardly displaced relation to the projecting portions of said shaped guiding members.

* * * * *